United States Patent
Shani

(10) Patent No.: US 9,843,532 B1
(45) Date of Patent: *Dec. 12, 2017

(54) SYSTEM, METHOD, AND COMPUTER PROGRAM FOR MANAGING DISTRIBUTION OF A FINITE AMOUNT OF RESOURCES

(71) Applicant: Amdocs Development Limited, Limassol (CY)

(72) Inventor: Omer Shani, Savyon (IL)

(73) Assignee: Amdocs Development Limited, Limassol (CY)

(*) Notice: Subject to any disclaimer, the term of this patent is extended or adjusted under 35 U.S.C. 154(b) by 129 days.

This patent is subject to a terminal disclaimer.

(21) Appl. No.: 15/058,047

(22) Filed: Mar. 1, 2016

Related U.S. Application Data

(63) Continuation of application No. 14/179,490, filed on Feb. 12, 2014, now Pat. No. 9,306,867, which is a continuation of application No. 12/888,336, filed on Sep. 22, 2010, now Pat. No. 8,688,825.

(51) Int. Cl.
*G06F 15/16* (2006.01)
*H04L 12/911* (2013.01)
*G06F 9/50* (2006.01)

(52) U.S. Cl.
CPC .......... *H04L 47/70* (2013.01); *G06F 9/5072* (2013.01); *G06F 2209/505* (2013.01); *G06F 2209/5011* (2013.01)

(58) Field of Classification Search
CPC ............ G06F 9/5072; G06F 2209/505; G06F 2209/5011
See application file for complete search history.

(56) References Cited

U.S. PATENT DOCUMENTS

| | | | | |
|---|---|---|---|---|
| 7,941,598 | B2 * | 5/2011 | Kaneda | G06F 3/0604 711/112 |
| 2003/0026291 | A1 * | 2/2003 | Engel | H04L 41/0896 370/468 |
| 2003/0055972 | A1 * | 3/2003 | Fuller | G06F 17/30082 709/226 |
| 2004/0078532 | A1 * | 4/2004 | Tremaine | G06F 9/5016 711/160 |
| 2005/0198641 | A1 * | 9/2005 | Eilam | G06F 9/5011 718/104 |
| 2005/0256938 | A1 * | 11/2005 | Margolin | G06Q 30/02 709/218 |
| 2006/0179106 | A1 * | 8/2006 | Turner | G06F 9/5072 709/201 |

(Continued)

*Primary Examiner* — Hieu Hoang
(74) *Attorney, Agent, or Firm* — Zilka-Kotab, PC

(57) ABSTRACT

A system, method, and computer program product are provided for managing distribution of a finite amount of resources. In use, a quota is received from a first repository, the quota including a portion of a finite amount of resources. Additionally, a plurality of requests is received from a plurality of entities, where each of the plurality of requests is requesting one or more of the resources. Further, the one or more of the resources are conditionally provided to the plurality of entities, in response to the plurality of requests. Further still, it is determined whether a predetermined amount of resources exist. Also, an additional quota is conditionally requested from the first repository, based on the determining.

20 Claims, 4 Drawing Sheets

(56) References Cited

U.S. PATENT DOCUMENTS

| | | | | |
|---|---|---|---|---|
| 2006/0223712 A1* | 10/2006 | Vinarov | ............... | H04M 15/00 |
| | | | | 505/126 |
| 2008/0005490 A1* | 1/2008 | Shiraki | ............... | G06F 3/0611 |
| | | | | 711/147 |
| 2008/0080529 A1* | 4/2008 | Kaler | ................... | H04L 67/104 |
| | | | | 370/401 |
| 2008/0216082 A1* | 9/2008 | Eilam | ................. | G06F 9/5072 |
| | | | | 718/104 |
| 2008/0301382 A1* | 12/2008 | Miki | .................... | G06F 3/0605 |
| | | | | 711/154 |
| 2009/0287825 A1* | 11/2009 | Walker | ................ | G06F 9/5072 |
| | | | | 709/226 |
| 2009/0304020 A1* | 12/2009 | Bodin | .................... | H04L 47/15 |
| | | | | 370/458 |
| 2010/0138627 A1* | 6/2010 | Ossia | ................... | G06F 3/0619 |
| | | | | 711/171 |
| 2010/0293346 A1* | 11/2010 | Miki | .................... | G06F 3/0605 |
| | | | | 711/154 |
| 2010/0325268 A1* | 12/2010 | Muthiah | ............... | G06F 9/505 |
| | | | | 709/224 |
| 2011/0213885 A1* | 9/2011 | Kelkar | ................ | G06F 9/5072 |
| | | | | 709/226 |

* cited by examiner

SYSTEM, METHOD, AND COMPUTER PROGRAM FOR MANAGING DISTRIBUTION OF A FINITE AMOUNT OF RESOURCES

CROSS-REFERENCE TO RELATED APPLICATIONS

This application is a continuation of U.S. application Ser. No. 14/179,490, filed Feb. 12, 2014, which is a continuation of U.S. application Ser. No. 12/888,336, filed Sep. 22, 2010, the entire contents of which are incorporated herein by reference.

FIELD OF THE INVENTION

The present invention relates to the distribution of resources, and more particularly to optimization of resource distribution.

BACKGROUND

In many circumstances, it has proven desirable to distribute finite amounts of certain resources to a plurality of entities. For example, a service provider may allocate a predetermined amount of service resources to a group of individuals. Unfortunately, conventional methods of distributing such resources to the plurality of entities have exhibited various limitations. For example, conventional methods of distributing such resources may prematurely distribute the resources among the entities, or may not be able to effectively distribute such resources among the plurality of entities at all, which may result in an inefficient distribution of the resources among the entities.

There is thus a need for addressing these and/or other issues associated with the prior art.

SUMMARY

A system, method, and computer program product are provided for managing distribution of a finite amount of resources. In use, a quota is received from a first repository, the quota including a portion of a finite amount of resources. Additionally, a plurality of requests is received from a plurality of entities, where each of the plurality of requests is requesting one or more of the resources. Further, the one or more of the resources are conditionally provided to the plurality of entities, in response to the plurality of requests. Further still, it is determined whether a predetermined amount of resources exist. Also, an additional quota is conditionally requested from the first repository, based on the determining.

DETAILED DESCRIPTION

Figure 1:
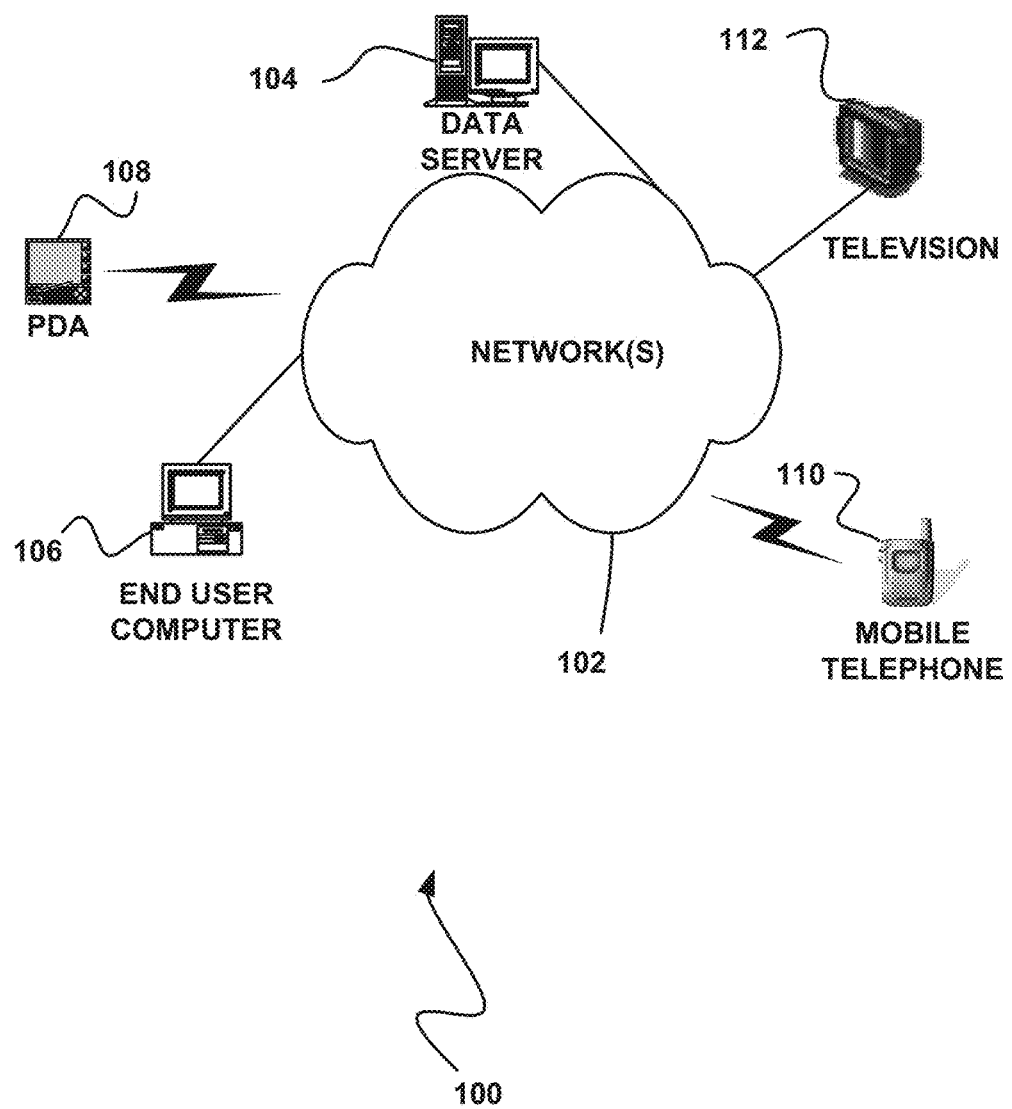
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
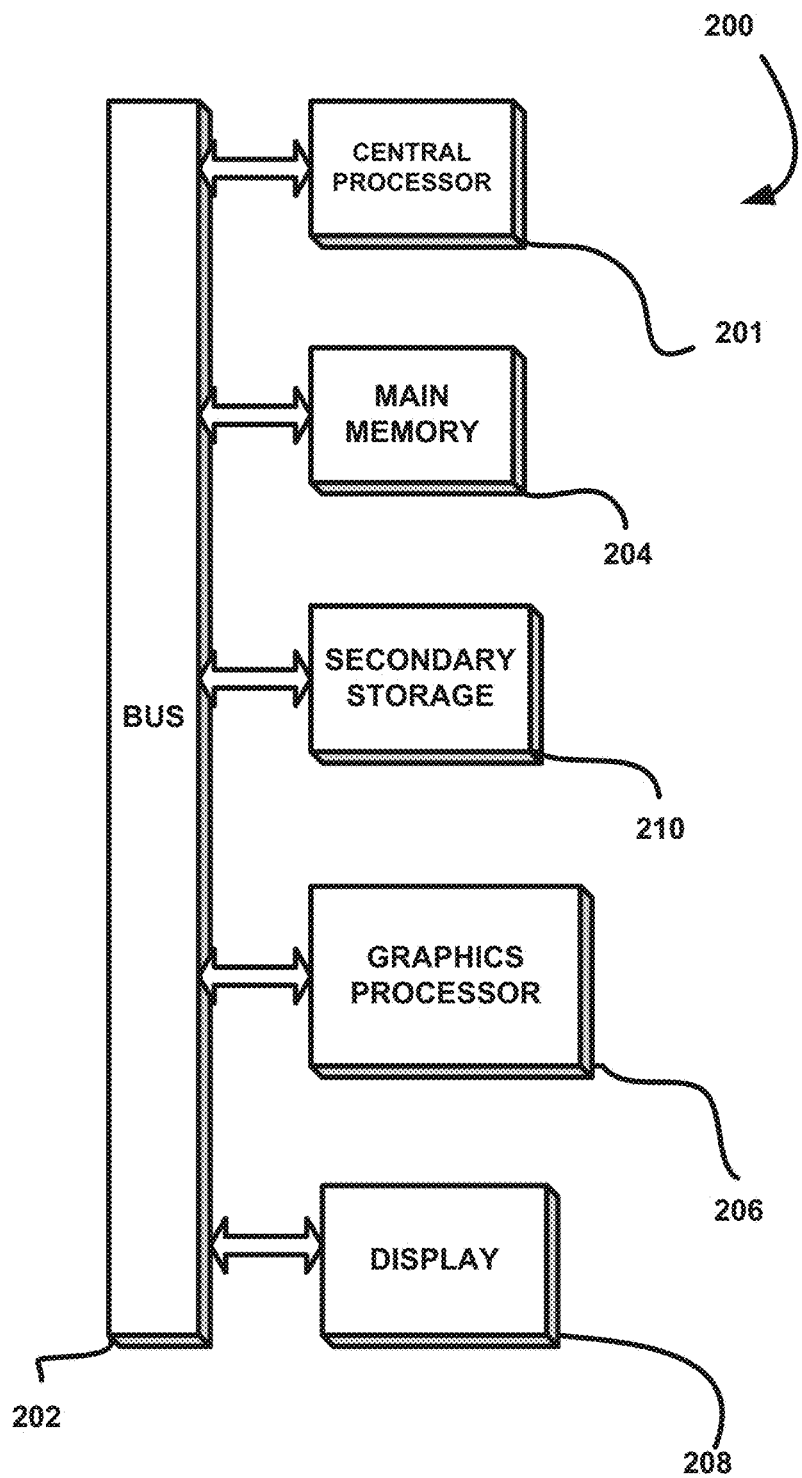
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
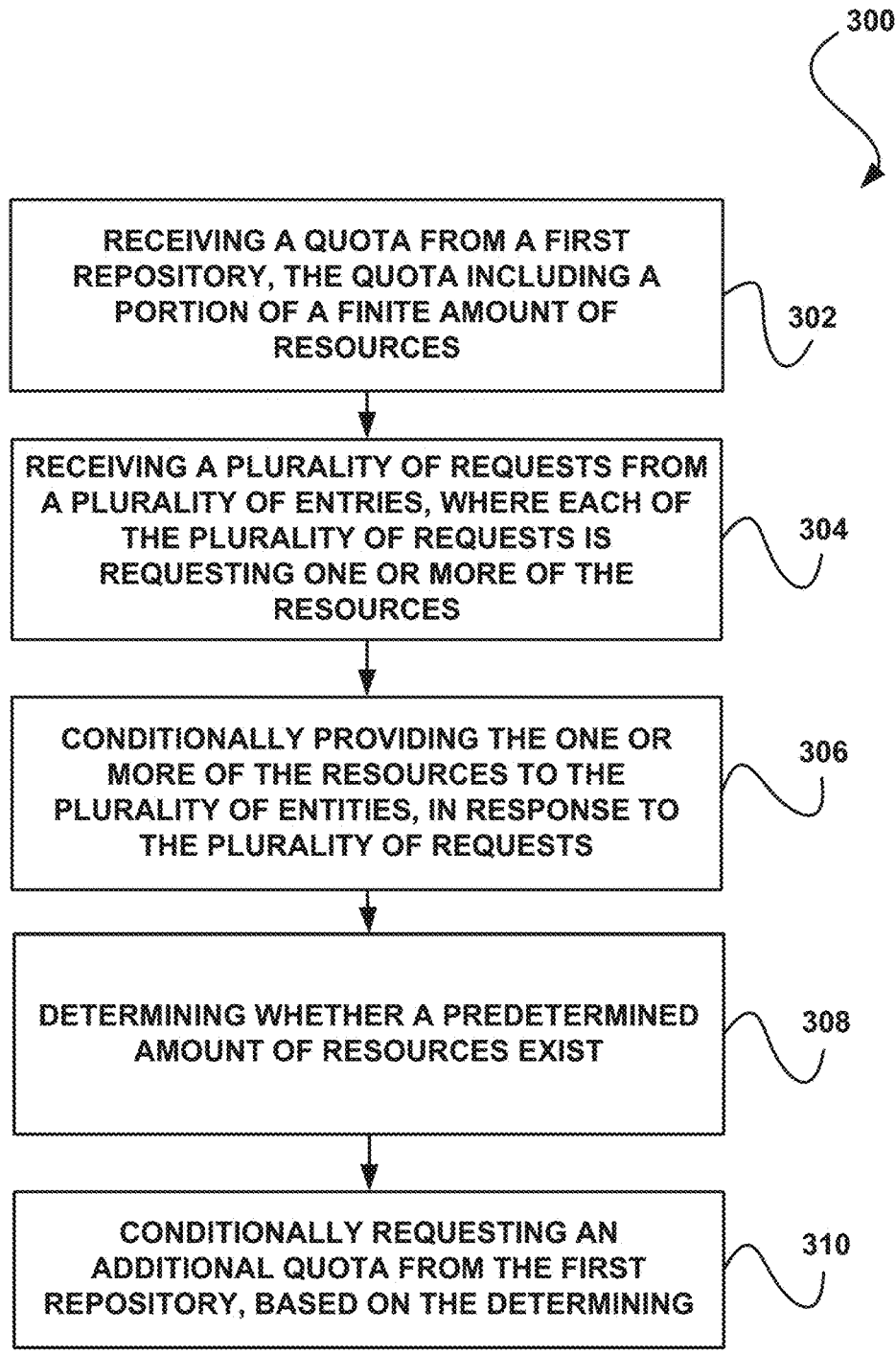
FIG. 3 illustrates a method for managing distribution of a finite amount of resources, in accordance with one embodiment.

FIG. 3 illustrates a method 300 for managing distribution of a finite amount of resources, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a quota is received from a first repository, the quota including a portion of a finite amount of resources. In the context of the present embodiment, the resources may include any goods or services able to be distributed. For example, the resources may include a telecommunications service (e.g., cellular phone minutes, text messages, etc.), a network service (e.g., network bandwidth, network storage, etc.), a business service, etc. In another embodiment, the resources may be free resources, resources that are paid for, resources that are complimentary with a paid product or service, etc.

Additionally, in one embodiment, the finite amount of resources may be associated with a package allocated to a plurality of entities. For example, the finite amount of resources may represent a service package, an allowance, etc. offered to a plurality of entities. In another embodiment, the finite amount of resources may be limited to a predetermined amount. For example, the finite amount of resources may be capped at a predetermined number of resources. In another example, the predetermined amount may be determined by a provider of the resources. Additionally, the finite amount of resources may contain any amount of resources (e.g., a small amount, a large amount, etc.).

Further, in another embodiment, the quota may include any portion of the finite amount of resources. For example, the quota may include a predetermined percentage of the finite amount of resources. In another example, the predetermined percentage may be determined by the provider of the resources. In yet another embodiment, the quota may be received in response to a request. For example, the quota may be received in response to a request for one or more of the resources, a request for the quota, etc. In still another embodiment, the quota may include an account quota associated with an account at the first repository.

Also, in one embodiment, the first repository may include any means for storing data associated with the finite amount of resources. For example, the first repository may include a data store (e.g., a central database, etc.), a computer (e.g., a server, etc.), etc. In another embodiment, the first repository may store the finite amount of resources. In yet another embodiment, the first repository may store a number associated with the finite amount of resources (e.g., the amount of resources, etc.). In still another embodiment, the first repository may include one or more applications. For example, the first repository may include an allocation application, a central account application, etc.

Additionally, in one embodiment, the quota may be received at a second repository. Further, the second repository may include any means for receiving the quota from the first repository. For example, the second repository may include a local data store, a local computer, a local server, a distributed site, etc. Further still, the second repository may include a processing engine. In one embodiment, the second repository may be one of a plurality of repositories. For example, the second repository may include one of a plurality of distributed sites. In another embodiment, the first repository and the second repository may be located on a single system. For example, the first repository and the second repository may be incorporated within a single server, computer, etc.

In yet another embodiment, the second repository may include one or more applications. For example, the second repository may include a branch application, a secondary data center, a distribution application, etc. Also, in another embodiment, the finite amount of resources may be associated with an account. For example, an account may be defined at the first repository, may be opened at the central application of the first repository, etc. Additionally, in one embodiment, the account may contain the finite amount of resources.

Further still, in one embodiment, the quota may be received by an electronic transfer. For example, the quota may be received by a network communication, a telephone communication, etc. Additionally, in another embodiment, the quota may be received in response to a request. For example, the quota may be received in response to a request for the quota, a request for one or more resources, etc. In yet another embodiment, quota may be received in response to an opening of the account. For example, an account may be defined in the first repository, and in response to the defining of the account, a quota may be sent to the second repository.

Additionally, as shown in operation 304, a plurality of requests is received from a plurality of entities where each of the plurality of requests is requesting one or more of the resources. In one embodiment, each of the plurality of entities may include an intended recipient of one or more of the resources. For example, each entity may have paid to receive one or more of the resources, may have subscribed (e.g., online, offline, etc.) to a service to receive one or more of the resources, may have been given one or more of the resources as a gift, as part of a promotion, etc. In another embodiment, each entity may include a client, an individual, a corporation, a family, a customer of one of a plurality of distributed sites, or any entity capable of receiving one or more of the resources.

In yet another embodiment, the plurality of entities may belong to a group. For example, the plurality of entities may belong to a closed user group. Additionally, the plurality of entities may share one or more attributes. For example, the plurality of entities may share a property (e.g., all having the same occupation, all families with the same last name, etc.). Further, group may have any number of the plurality of entities (e.g., a large number, a small number, etc.).

In another embodiment, the plurality of entities may be associated with the finite amount of resources. For example, the finite amount of resources may be distributed among the plurality of entities. In yet another embodiment, the plurality of entities may be associated with the second repository. For example, the second repository may have a customer base comprising the plurality of entities. Additionally, in yet another embodiment, each of the plurality of requests may include a request to utilize one or more of the resources.

In yet another embodiment, the plurality of requests may be received automatically from the plurality of entities. Additionally, the plurality of requests may be received according to a schedule. Further, in another embodiment, the plurality of requests may be received in response to one or more criteria (e.g., a signal, a comparison result, processing demand, etc.). Of course, however, the plurality of requests may be received from the plurality of entities in any manner.

Further, as shown in operation 306, one or more of the resources are conditionally provided to a plurality of entities, in response to the plurality of requests. In one embodiment, the one or more resources may be provided to each entity based on an algorithm upon a request or a schedule. For example, the one or more resources may be provided to each entity on a first in, first out (FIFO) order based on when each request was received. In another example, the one or more resources may be provided to each entity based on a number of resources requested by the entity. For example, the number of resources requested by each entity may be compared against a number of available resources. Additionally, if the number of requested resources is less than the number of resources available, the requested resources may be provided to the entity. Further, if the number of requested resources is more than the number of resources available, the requested resources may not be provided to the entity. Of course, however, the one or more of the resources may be conditionally provided to the plurality of entities in any manner.

Additionally, a number of available resources may be adjusted if the one or more resources are provided to each entity. For example, when the quota is received from the first repository, the number of resources in the quota may be added to the number of available resources of the second repository. Further, if the one or more resources are then provided to each entity, the number of resources provided to each entity may be subtracted from the number of available resources of the second repository. Additionally, the one or more of the resources may be conditionally provided to a plurality of entities based on a usage quota associated with the plurality of the entities.

Further still, as shown in operation 308, it is determined whether a predetermined amount of resources exist. For example, it may be determined whether a predetermined amount of resources exist at the second repository. In one embodiment, the determining may include comparing the number of available resources at the second repository against a predetermined value. For example, the predetermined value may include a minimum amount of resources that are needed at the second repository. In another example, the predetermined value may include a low watermark that triggers an additional quota request by the second repository.

Also, as shown in operation 310, an additional quota is conditionally requested from the first repository, based on the determining. In one embodiment, the additional quota may be requested from the first repository by the second repository if the predetermined amount of resources does not exist at the second repository. For example, the additional quota may be requested from the first repository by the second repository if the amount of resources in the second repository is less than the predetermined value.

In another embodiment, the additional quota may not be requested from the first repository by the second repository if the predetermined amount of resources does exist at the second repository. For example, the additional quota may not be requested from the first repository by the second repository if the amount of resources in the second repository is equal to or more than the predetermined value. In this way, the finite amount of resources may be effectively distributed among each of the plurality of entities.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
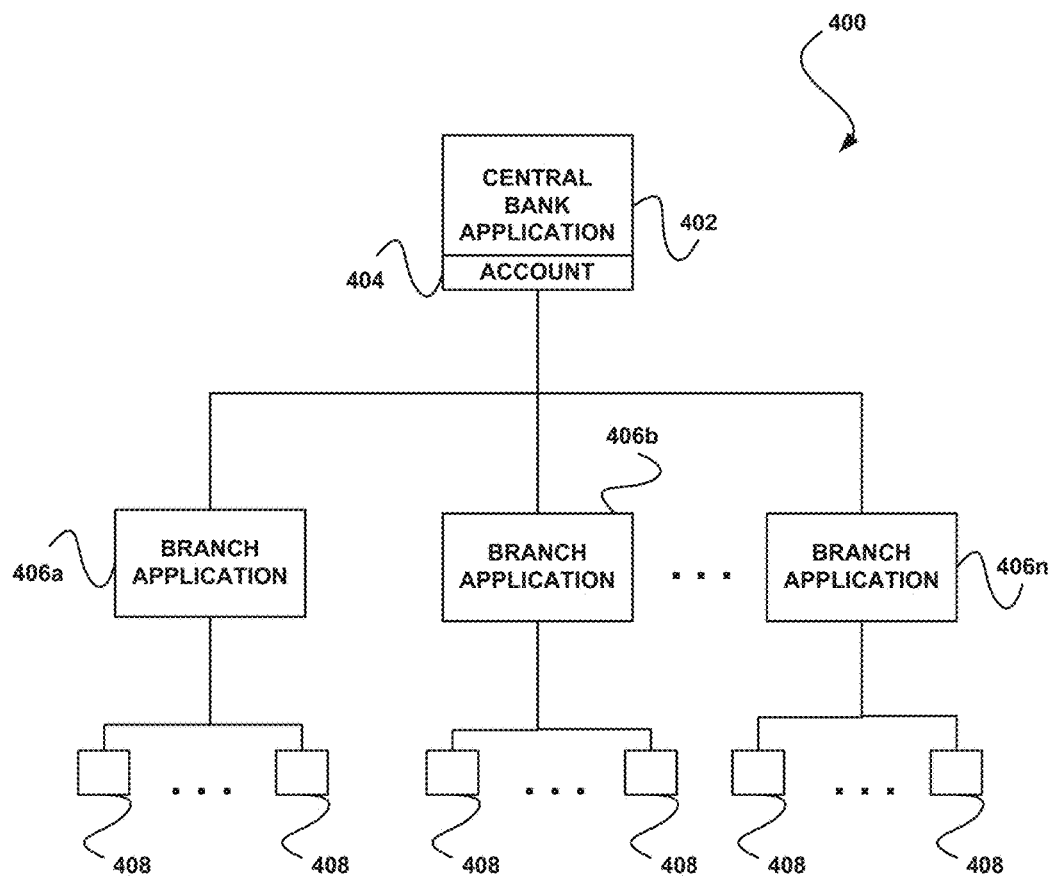
FIG. 4 illustrates a system for managing distribution of a finite amount of resources, in accordance with another embodiment.

FIG. 4 illustrates a system 400 for managing distribution of a finite amount of resources, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, a central resource repository application 402 associated with a resource account 404 is in communication with a plurality of branch applications 406a-n. Additionally, each of the plurality of branch applications 406a-n is in communication with a plurality of clients 408. In one embodiment, the resource account 404 may reside in the central bank application 402. In another embodiment, the central resource account 404 may include a finite amount of resources to be distributed among the clients 408. Additionally, in one embodiment, each of the branch applications 406a-n may include a processing engine. For example, each of the branch applications 406a-n may be installed on a processing engine.

Further, in one embodiment, a quota may be sent from the central bank application 402 to each of the plurality of branch applications 406a-n. For example, the quota sent to each of the plurality of branch applications 406a-n may represent a portion of the finite amount of resources included within the central resource account 404. For instance, the quota sent to each of the plurality of branch applications 406a-n may represent a percentage of the finite amount of resources included within the resource account 404. In another embodiment, each of the plurality of branch applications 406a-n may store their received quota in a storage location. For example, each of the plurality of branch applications 406a-n may store their received quota in a local account of the respective branch application 406a-n.

Additionally, in one embodiment, the sum of all the quotas sent to each of the plurality of branch applications 406a-n may be significantly smaller than the finite amount of resources included within the central resource account 404. For example, the sum of all the quotas sent to each of the plurality of branch applications 406a-n may represent a quarter of the finite amount of resources included within the resource account 404, a third of the finite amount of resources included within the resource account 404, etc.

Further, in another embodiment, the quotas sent to each of the plurality of branch applications 406a-n may be sufficiently large in order to support each of the clients 408 drawing from their respective branch application 406a-n. For example, the quotas sent to each of the plurality of branch applications 406a-n may be large enough to allow for servicing at least a predetermined number of requests for one or more resources from their respective clients 408.

In another embodiment, one or more of the plurality of clients 408 may send a request to their respective branch application 406a-n for one or more of the resources distributed in the quota to the branch applications 406a-n. For example, one or more of the plurality of clients 408 may send a request to their respective branch application 406a-n to utilize one or more of the resources in the local account of the respective branch application 406a-n.

In yet another embodiment, the branch applications 406a-n may provide one or more of the resources received from the central account application 402 to one or more of the plurality of clients 408 in response to the clients' 408 requests for one or more of the resources distributed in the quota to the branch applications 406a-n. In one embodiment, each of the branch applications 406a-n may serve their respective clients 408 on a first in, first out (FIFO) basis. For example, a client 408 whose first request is received by their respective branch application 406a-n before a later request by another client 408 may receive their one or more requested resources before the other client 408.

Further, in one embodiment, one or more of the branch applications 406a-n may decrement one or more resources from the quota sent to them from the central bank application 402 in response to providing their respective clients 408 with the one or more resources. For example, a branch application 406a-n may decrement a resource from their local account when that resource is provided to a client 408 of the branch application 406a-n.

Further still, in one embodiment, one or more of the branch applications 406a-n may determine whether a low watermark with respect to their quota is exceeded. For example, one or more of the branch applications 406a-n may compare an amount of resources in their local account to a predetermined amount associated with a low amount of resources. Additionally, if the amount of resources the local account of a branch application 406a-n is less than the predetermined amount associated with a low amount of resources, it may be determined that the branch application 406a-n has exceeded their low watermark.

Also, in another embodiment, if one or more of the branch applications 406a-n determine that the low watermark with respect to their quota is exceeded, the one or more branch applications 406a-n may request an additional quota from the central bank application 402. In this way, a determination of a low watermark in one or more of the branch applications 406a-n may trigger a transfer request for an additional quota from the central bank application 402

In addition, in one embodiment, if the central bank application 402 receives a request for the additional quota from the branch application 406a-n, it may first determine whether sufficient resources exist in its resource account 404. For example, the central bank application 402 may compare a number of resources remaining in its resource account 404 against a predetermined value (e.g., the number of resources in a quota, a predetermined low watermark value, etc.).

Furthermore, the central bank application 402 may conditionally send a quota to the requesting branch application 406a-n, based on the determination whether sufficient resources exist in its resource account 404. For example, if the central bank application 402 determines that the number of resources remaining in its resource account 404 is greater than the predetermined value, the central bank application 402 may send the quota to the requesting branch application 406a-n. In another example, if the central bank application 402 determines that the number of resources remaining in its resource account 404 is less than the predetermined value, the central bank application 402 may not send the quota to the requesting branch application 406a-n.

Further still, in one embodiment, if the central bank application 402 determines that the number of resources remaining in its resource account 404 is less than the predetermined value, the central bank application 402 may perform an additional action. For example, the central bank application 402 may split the amount of resources remaining in its resource account 404 and may push the split quota among all the branch applications 406a-n. In this way, the branch applications 406a-n may be notified that the resource account 404 of the central bank application 402 is empty when they receive their share of the pushed split quota.

In another example, if the central bank application 402 determines that the number of resources remaining in its resource account 404 is less than the predetermined value, the central bank application 402 may send the amount of resources remaining in its resource account 404 to the next requesting branch application 406a-n, and may return empty responses to all subsequent requests. In this way, the branch applications 406a-n may be notified that the resource account 404 of the central bank application 402 is empty when they receive an empty response to their quota request.

Also, in one embodiment, the size of the quotas sent from the central bank application 402 to the requesting branch application 406a-n may decrease as the amount of resources remaining in the resource account 404 decreases. For example, the central bank application 402 may compare a number of resources remaining in its resource account 404 against a predetermined value (e.g., a midpoint value, a value slightly higher than the predetermined low watermark value, etc.), and if the number of resources remaining in its resource account 404 is less than the predetermined value, the central account application 402 may decrease the size of the quotas sent to the requesting branch application 406a-n. For instance, the central account application 402 may divide the quotas in half, reduce the quotas by a predetermined percentage, etc. In this way, the remaining number of resources in the resource account 404 may be more evenly distributed to the requesting branch applications 406a-n, even though the number of total request from the account will be larger.

In yet another embodiment, a branch application 406a-n that has a number of resources greater than a predetermined amount may return a portion of their resources to the central bank application 402. For example, the number for resources in the local account of each branch application 406a-n may be compared against a predetermined value (e.g., a high watermark, etc.), and any resources in a local account greater than the predetermined value may be returned to the central bank application 402. In another embodiment, any returned resources may be redistributed to the branch applications 406a-n (e.g., to the branch applications 406a-n other than the branch applications 406a-n that returned the resources). In this way, a branch application 406a-n that has excess resources can send such excess resources to the central account application 402 for redistribution.

Furthermore, in one embodiment, the branch applications 406a-n may return their resources to the central bank application 402 in response to one or more determinations by the central account application 402. For example, the central account application 402 may compare a number of resources remaining in its resource account 404 against a predetermined value (e.g., a low watermark value, etc.), and if the number of resources remaining in its resource account 404 is less than the predetermined value, the central account application 402 may require each of the branch applications 406a-n to return all resources in their local accounts to the resource account 404 of the central account application 402.

In another embodiment, the central account application 402 may then redistribute the resources in the resource account 404 to the branch applications 406a-n based on one or more criteria. For example, the central account application 402 may redistribute the resources in the resource account 404 to the branch applications 406a-n in amounts based on the prior usage of resources by the branch applications 406a-n. In another embodiment, the central account application 402 may redistribute the resources in the resource account 404 to the branch applications 406a-n evenly using quotas. Of course, however, the central account application 402 may redistribute the resources in the resource account 404 to the branch applications 406a-n in any manner.

In this way, the resources in the resource account 404 of the central account application 402 may be distributed equally and efficiently to the branch applications 406a-n. Additionally, the resources in the resource account 404 of the central account application 402 may be specific to the branch applications 406a-n, and not just to an individual branch application. Further, the branch applications 406a-n may not have to communicate between themselves using traditionally inefficient means to allocate resources, thereby improving performance. Further still, the above mechanism may be utilized for centralized limits.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium having stored thereon a computer program, the computer program comprising:
 computer code for receiving, at each of a plurality of branch repositories, a quota from a central repository, wherein each of the received quotas includes a portion of a finite amount of resources;

computer code for receiving, at one of the branch repositories, a plurality of requests from a plurality of entities, each of the plurality of requests requesting one or more of the resources previously received at the one of the branch repositories;

computer code for conditionally providing, from the one of the branch repositories, the one or more of the resources to the plurality of entities, in response to the plurality of requests;

computer code for determining, by the one of the branch repositories, whether a first predetermined amount of resources exists at the one of the branch repositories;

computer code for conditionally requesting, by the one of the branch repositories, an additional quota from the central repository, based on the determining;

computer code for, in response to determining, at the central repository, that a first amount of resources remaining at the central repository is less than a second predetermined amount of resources, splitting, by the central repository, the first amount of resources remaining at the central repository into a plurality of second portions of resources; and computer code for receiving, by the one of the branch repositories from the central repository in response to the request for the additional quota, one of the second portions of resources remaining at the central repository.

2. The non-transitory computer readable medium of claim 1, wherein the computer program is operable such that the finite amount of resources is associated with a package allocated to the plurality of entities.

3. The non-transitory computer readable medium of claim 1, wherein the quota includes an account quota associated with an account at the central repository.

4. The non-transitory computer readable medium of claim 1, wherein the plurality of entities belong to a group.

5. The non-transitory computer readable medium of claim 1, wherein the plurality of entities share one or more attributes.

6. The non-transitory computer readable medium of claim 1, wherein the computer program is operable such that the one or more resources are provided to each entity based on an algorithm.

7. The non-transitory computer readable medium of claim 1, wherein the one or more resources are provided to each entity on a first in, first out (FIFO) order based on when each request was received.

8. The non-transitory computer readable medium of claim 1, wherein the computer program is operable such that the determining includes comparing a number of available resources at the one of the branch repositories against a predetermined value.

9. The non-transitory computer readable medium of claim 8, wherein the predetermined value includes a minimum amount of resources that are needed at the one of the branch repositories.

10. The non-transitory computer readable medium of claim 8, wherein the predetermined value includes a predetermined low amount that triggers an additional quota request by the one of the branch repositories.

11. The non-transitory computer readable medium of claim 1, wherein the computer program is operable such that the additional quota is requested from the central repository by the one of the branch repositories if the first predetermined amount of resources does not exist at the one of the branch repositories.

12. The non-transitory computer readable medium of claim 1, wherein the computer program is operable such that the additional quota is not requested from the central repository by the one of the branch repositories if the first predetermined amount of resources does exist at the one of the branch repositories.

13. The non-transitory computer readable medium of claim 1, wherein the computer program is operable such that a number of available resources at the one of the branch repositories is adjusted when the one or more resources are provided to the plurality of entities.

14. The non-transitory computer readable medium of claim 13, wherein the computer program is operable such that when the quota is received from the central repository, a number of resources in the quota are added to the number of available resources at the one of the branch repositories.

15. A method, comprising:

receiving, at each of a plurality of branch repositories, a quota from a central repository, wherein each of the received quotas includes a portion of a finite amount of resources;

receiving, at one of the branch repositories, a plurality of requests from a plurality of entities, each of the plurality of requests requesting one or more of the resources previously received at the one of the branch repositories;

conditionally providing, from the one of the branch repositories, the one or more of the resources to the plurality of entities, in response to the plurality of requests;

determining, by the one of the branch repositories, whether a first predetermined amount of resources exists at the one of the branch repositories;

conditionally requesting, by the one of the branch repositories, an additional quota from the central repository, based on the determining;

in response to determining, at the central repository, that a first amount of resources remaining at the central repository is less than a second predetermined amount of resources, splitting, by the central repository, the first amount of resources remaining at the central repository into a plurality of second portions of resources; and receiving, by the one of the branch repositories from the central repository in response to the request for the additional quota, one of the second portions of resources remaining at the central repository.

16. The method of claim 15, wherein the additional quota is not requested from the central repository by the one of the branch repositories if the first predetermined amount of resources does exist at the one of the branch repositories.

17. The method of claim 15, wherein a number of available resources at the one of the branch repositories is adjusted when the one or more resources are provided to the plurality of entities.

18. The method of claim 17, wherein when the quota is received from the central repository, a number of resources in the quota are added to the number of available resources at the one of the branch repositories.

19. A system, comprising:

at least one processor for:

receiving, at each of a plurality of branch repositories, a quota from a central repository, wherein each of the received quotas includes a portion of a finite amount of resources;

receiving, at one of the branch repositories, a plurality of requests from a plurality of entities, each of the plurality of requests requesting one or more of the resources previously received at the one of the branch repositories;

conditionally providing, from the one of the branch repositories, the one or more of the resources to the plurality of entities, in response to the plurality of requests;

determining, by the one of the branch repositories, whether a first predetermined amount of resources exists at the one of the branch repositories;

conditionally requesting, by the one of the branch repositories, an additional quota from the central repository, based on the determining;

in response to determining, at the central repository, that a first amount of resources remaining at the central repository is less than a second predetermined amount of resources, splitting, by the central repository, the first amount of resources remaining at the central repository into a plurality of second portions of resources; and receiving, by the one of the branch repositories from the central repository in response to the request for the additional quota, one of the second portions of resources remaining at the central repository.

20. The system of claim 19, wherein the at least one processor is coupled to memory via a bus.

* * * * *